350-96.33 SR
1/1/80 OR 4,181,403

United States Patent [19]

Macedo et al.

[11] 4,181,403

[45] Jan. 1, 1980

[54] OPTICAL FIBER WITH COMPRESSION SURFACE LAYER

[75] Inventors: Pedro B. Macedo, Bethesda, Md.; Robert K. Mohr, Washington, D.C.; Prabhat K. Gupta, Mount Rainier, Md.

[73] Assignees: Pedro Buarque De Macedo, Bethesda; Theodore Aaron Litovits, Silver Spring, both of Md.

[21] Appl. No.: 755,588

[22] Filed: Dec. 30, 1976

[51] Int. Cl.[2] .......................... G02B 5/14; C03C 3/04; C03C 25/02

[52] U.S. Cl. .................................. 350/96.33; 65/3 A; 106/50; 106/52; 106/53; 350/96.3

[58] Field of Search .......................... 65/3 A, DIG. 7; 350/466 N, 96.29, 96.30, 96.31, 96.33, 96.34; 106/50, 52, 53

[56] References Cited

U.S. PATENT DOCUMENTS

| | | | |
|---|---|---|---|
| 3,650,780 | 3/1972 | Connelly | 65/DIG. 7 X |
| 3,659,915 | 5/1972 | Maurer et al. | 65/DIG. 7 X |
| 3,782,914 | 1/1974 | DeLuca et al. | 65/DIG. 7 X |
| 3,785,718 | 1/1974 | Gloge | 350/96 GN X |
| 3,823,997 | 7/1974 | Gloge et al. | 350/90 GN X |
| 3,884,550 | 5/1975 | Maurer et al. | 65/DIG. 7 X |
| 3,962,515 | 6/1976 | Dumbaugh, Jr. et al. | 350/96.3 X |
| 4,110,093 | 8/1978 | Macedo et al. | 65/3 R |
| 4,110,096 | 8/1978 | Macedo et al. | 65/30 R |

*Primary Examiner*—S. Leon Bashore
*Assistant Examiner*—Frank W. Miga
*Attorney, Agent, or Firm*—Fleit & Jacobson

[57] ABSTRACT

A glass dielectric fiber waveguide with a composition profile varying radially from the center to the surface, the composition profile causing a surface layer which is in compression, said composition profile being caused by (a) at least one dopant used substantially to create a stress profile wherein the surface is in compression, and (b) at least one dopant used substantially for the purpose of creating an index of refraction profile.

6 Claims, 4 Drawing Figures

OPTICAL FIBER WITH COMPRESSION SURFACE LAYER

I BACKGROUND

A. Field of the Invention

This invention relates to glass optical fibers which are defined as glass fibers having a radial variation of index of refraction confining the light to propagate along its length without substantially reaching its cylindrical surface and having an attenuation of less than 1 dB/km or 1000 dB/km.

This invention further relates to glass optical fibers having a surface layer different in composition from the interior which are drawn from preforms having a surface layer different in composition from the interior and such that in the fibers and preforms, the surface layer is in compression and the interior in tension. In particular this invention relates to a method of increasing the abraded strength of glass fiber waveguides.

B. Brief Description of the Prior Art

Fibers may be manufactured by a variety of techniques which exhibit in the pristine state tensile strengths of approximately $10^6$ psi. Mechanical and chemical damage to the surface aided by stress corrosion will quickly degrade the tensile strength of an unprotected fiber to tensile strengths on the order of 15,000 psi or less, reducing or eliminating the practical uses of such a fiber. The method of preserving fiber strength has been to apply a coating material such as a polymer to protect the fiber mechanically against damage due to abrasion and due to chemical corrosion form water or other causes. No protective coating will provide absolute protection against mechanical damage and chemical corrosion, nor can a coating prevent the stress corrosion caused by any mechanical stress on the fiber.

The guidance of those practiced in the art of producing glass clad optical fibers has been to carefully select compositions for the core and clad of such a fiber to match certain physical properties. "For each system it is necessary to vary the composition as between core and cladding to achieve the required refractive index difference, which must be small and well controlled. This usually results in differences in softening temperature and melt viscosity, and thermal expansion coefficient. As a result the final product is likely to have built-in stresses, and it is desirable that these should be reduced to a minimum to achieve optimum optical and mechanical properties."[1] Others who are practiced in the art of producing optical fibers have recommended matching the coefficient of thermal expansion and the glass transition temperature of the core and cladding regions.[2,3]

1. Foord, S. G., et al., "Some Design Principles for Fibre Optical Calbes," Proc. 23rd Int'l. Wire and Cable Conf., Atlantic City, N.J., Dec. 3-5, 1974, pp 276-280.
2. Pearson, D. C., et al., "Light Guidance in Glass Media," Amer. Ceram. Soc. Bul. 49, 969 (1970).
3. Newns, U.S. Pat. No. 3,957,342 issued to Newns, et al., May 18, 1976.

It is well known to those practiced in the art or producing strengthened glass articles that causing the article to be manufactured with a surface layer in compression will prevent strength degradation due to chemical and stress corrosion.

C. Summary of the Invention

In accordance with the present invention there is provided a method for preserving the strength of an optical fiber. The method involves producing a preform by any means which yields a surface layer in compression and the interior in tension and when pulled into a fiber nearly maintains that prestress profile. In accordance with the methods of strengthening glass articles such a prestressed glass fiber will be protected against stress and chemical corrosion as long as it is subjected to stresses less than the prestress compression of the surface. We have discovered that despite teachings to the contrary by those skilled in the art a low loss optical waveguide can be produced from preforms which have large prestresses.

In one embodiment of this invention dopant or combinations of dopants is used to obtain both the index and stress profiles. In another embodiment of this invention one dopant or combination of dopants is used substantially to create an index of refraction profile and another dopant or combination of dopants is used substantially to create the stress profile.

II DETAILED DESCRIPTION OF THE INVENTION

The present invention describes a method of producing a strengthened glass fiber by pulling it from a preform whose interior has an expansion coefficient sufficiently larger than the surface layer that in the manufacture of said preform there occurs a large (>18,000 psi) compressive stress in the surface layer. The fiber pulled from such a preform will also have a surface layer under compressive stress. Further protection may be offered by coating the glass waveguide with metal or polymer.

General guidance may be given for the selection of materials and relative radial dimensions for the surface (clad) and interior (core) of the preforms. In order to produce a preform with surface compression, it is required that the interior of the preform contract during manufacture after the surface has passed through its glass transition and that the interior contract relatively more than the surface, resulting in net compression at the surface. To facilitate the achievement of large compression in the clad, the radius of the core should be more than a factor of 10 and preferably more than a factor of 50, larger than the thickness of the clad. In other words the surface layer should have a predetermined thickness which is less than 10%, preferably less than 2%, of the radius of the Core. It would further facilitate the achievement of relatively more compression in the preform surface if the glass transition temperature $T_g$ of the clad is at least 100° C. higher than that of the core, preferably 250° C. or higher.

To produce an optical fiber it is required that the surface layer have a relatively lower refractive index than the interior. The thickness of the optical clad depends on the loss desired and on the numerical aperture of the fiber. For fibers having attenuation below 30 dB/km and numerical apertures above 0.1, several microns clad thickness is usually recommended. It is not required that the optical index profile and mechanical stress profile be the same. Although it is understood that a dopant may have some effect on both index and stress profiles by suitable manufacture the radial distribution of dopants provides the desired optical profile and the distribution of dopants which substantially provide the mechanical stress profile may be different. This can be of considerable advantage. Because of the manner in which optical fibers are normally manufactured and used, deep scratches are avoided and therefore the mechanical clad can be very thin (i.e., less than 1 micron in a 100 micron fiber), while allowing the optical clad to be several microns thick which is needed for low loss light guidance; or allowing the optical profile to be parabolic while the mechanical profile has a step variation.

The variations of fiber configuration are further illustrated in the attached drawing wherein, FIG. 1 is a fiber cross section with coincident step index and stress producing composition profiles. The dopant concentration as a function of radial position is also shown. The core is denoted by 1, the clad by 2, and the protective coating by 3.

Figure 1:
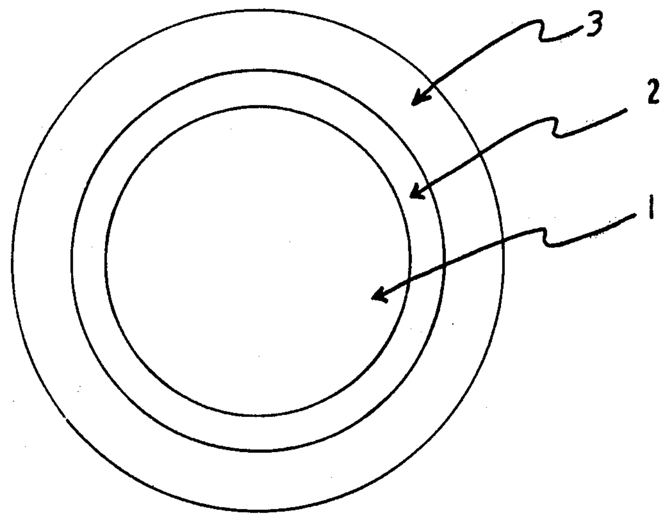
Figure 1:
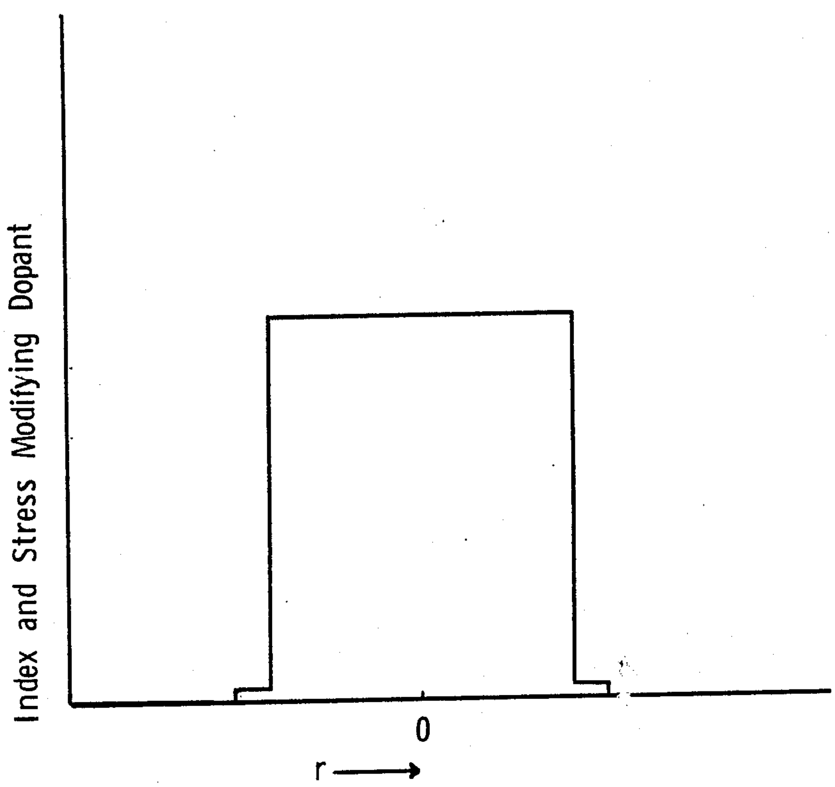
Figure 2:
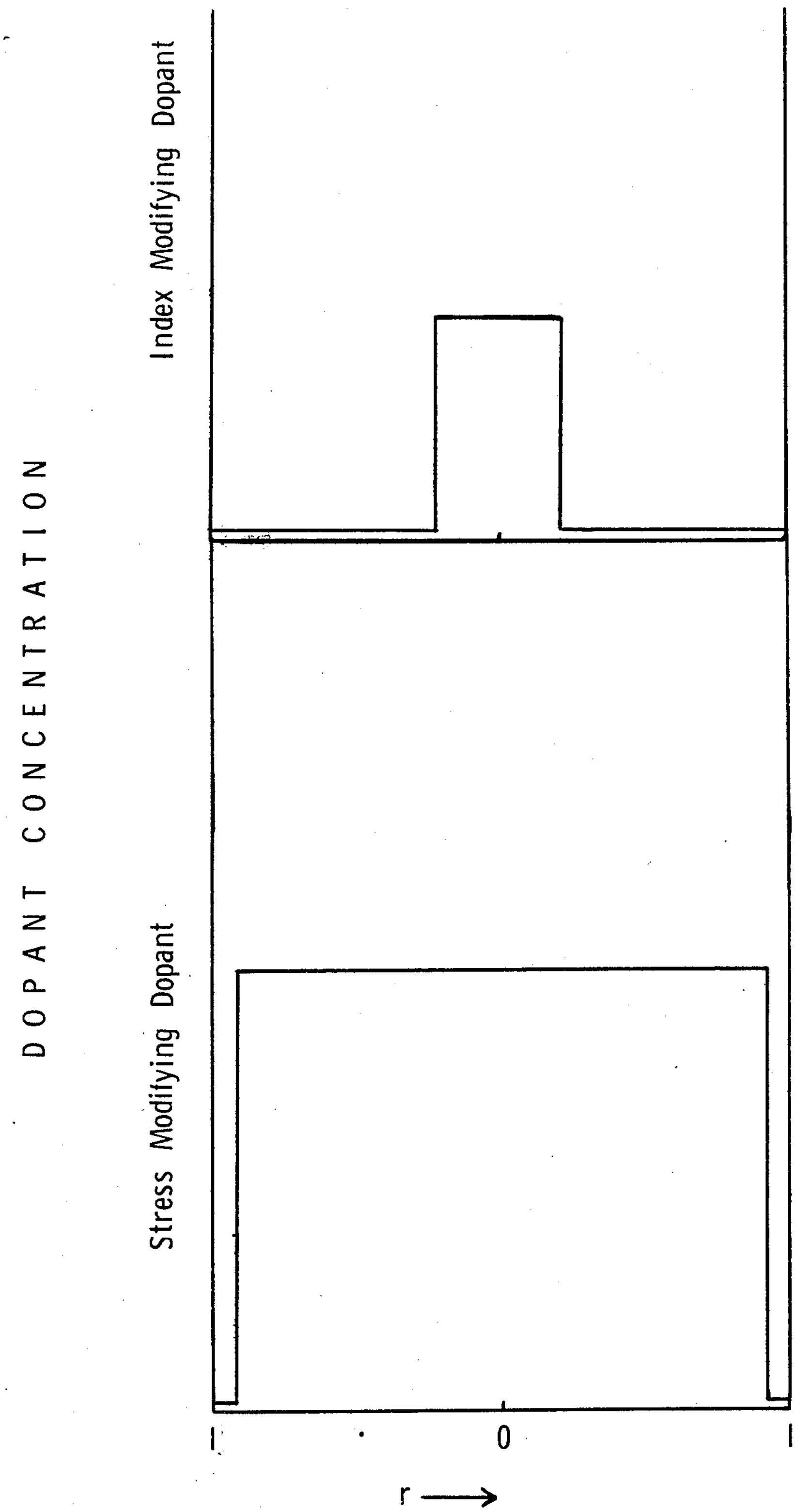
FIG. 2 is a plot of index and stress modifying dopant as a function of radial position for a single mode step index fiber.
Figure 3:
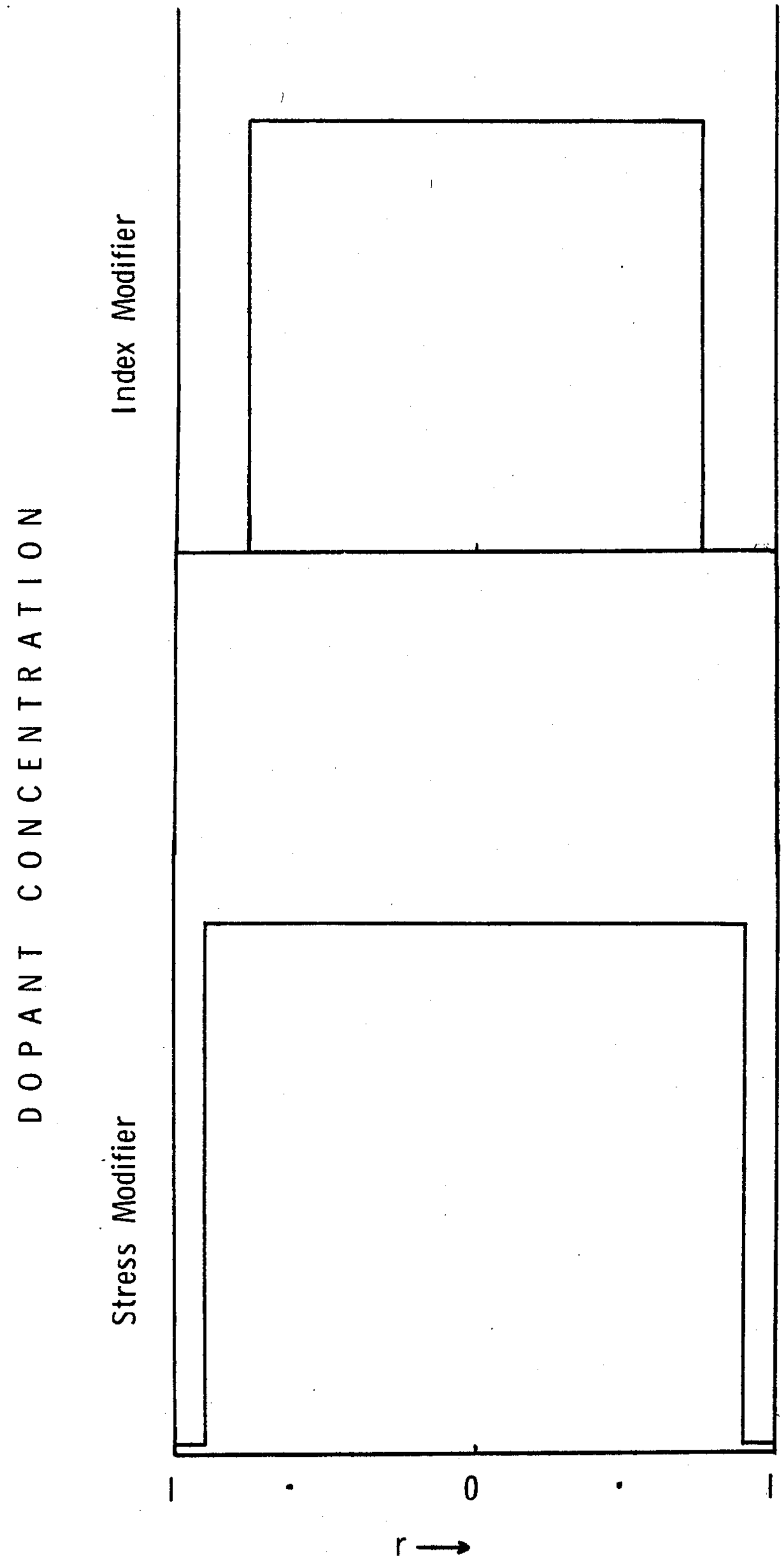
FIG. 3 is a plot of index and stress modifying dopant as a function of radial position or a multimode step index fiber.
Figure 4:
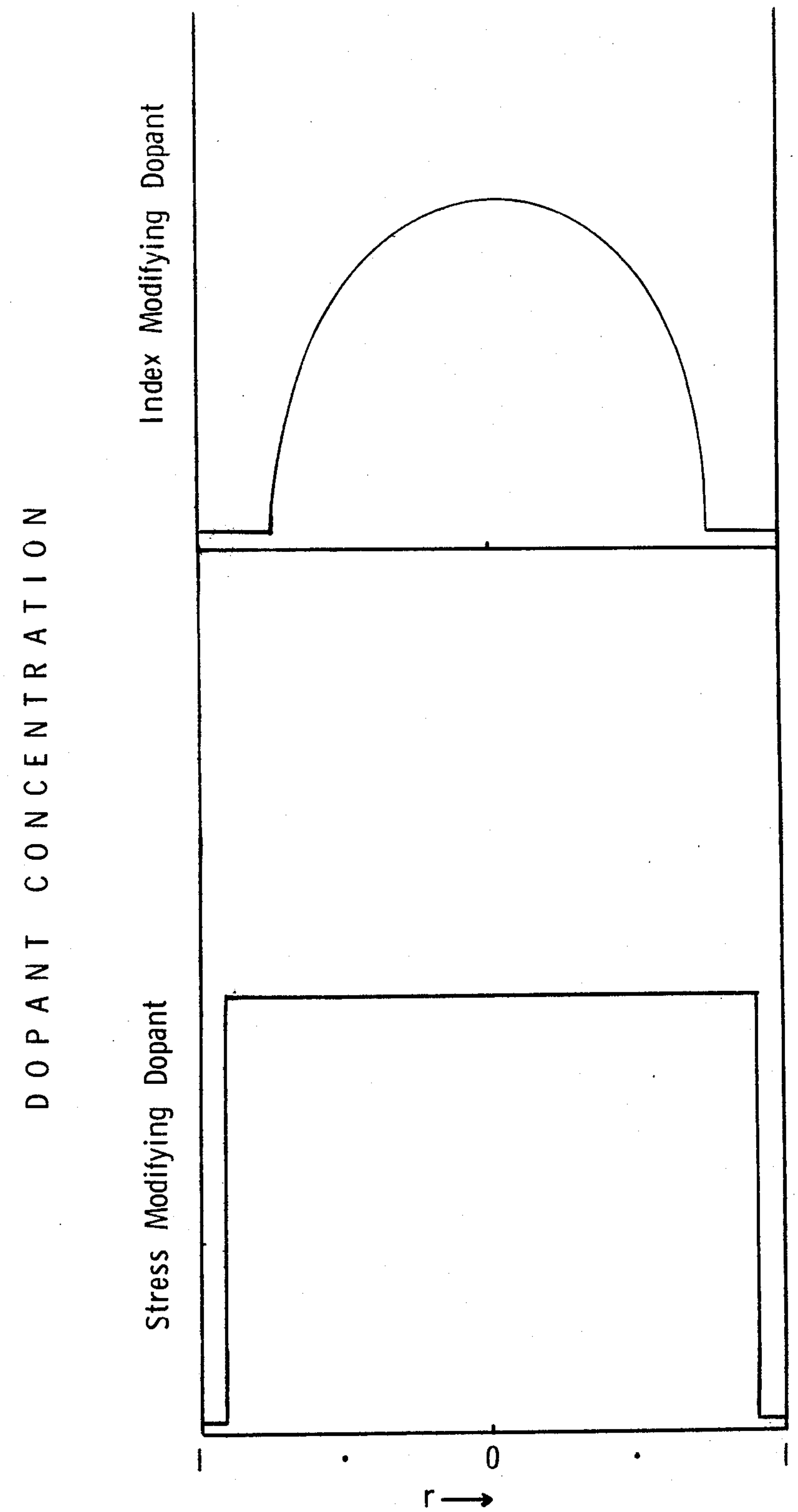

FIG. 4 is a plot of index and stress modifying dopant as a function of radial position for a multimode graded index fiber. There are many techniques by which one may produce a preform with the necessary requirements. In one variation, $GeO_2$—$SiO_2$ with 20 mole percent $GeO_2$ or less may be deposited as soot, according to the method of Keck et al U.S. Pat. No. 3,737,292 This doped core is then dried and collapsed and subsequently used as a support for the deposition of silica soot or borosilicate soot. A clad layer with relative thickness as suggested above is deposited and the resultant rod is dried and collapsed, yielding a prestressed preform having net compression at the surface.

A useful modification of the above involves the deposition first of the borosilicate soot on the doped core to act as an optical clad and depositing the silica soot to act as a mechanical clad. In the finished fiber the silica clad should be less than 1/20 the radius of the fiber, preferably less than 1/50 the radius of the fiber.

The preform may be drawn into a prestressed optical fiber by heating it in a furnace with a temperature profile cylindrically symmetric about the preform's major axis. Care must be taken to assure that the axis of the draw down region of the preform remains centered in the preform axis in order to preserve the prestress profile.

In a second variation a preform is drawn from a melt having a layer of clad composition floating on the core composition according to the method of U.S. Pat. No. 3,726,656. The core layer is a lead silicate and the clad layer a low expansion borosilicate. A preform is pulled from the melt with relative dimension of the core and clad as suggested above and such that upon cooling the surface is in compression. The prestressed preform is then drawn into a fiber in the manner given above.

In a third variation an alkali borosilicate glass is melted and drawn into a homogeneous rod. The rod is heat treated to cause phase separation into a silica-rich and a silica-poor phase. A clad layer is produced by leaching with a mineral acid to a desired depth. The rod is then washed, dried and consolidated, yielding a preform with high compression at the surface. The high silica clad will have a relatively lower refractive index than the unleached alkali borosilicate core. This preform is then drawn into a prestressed fiber by the method given above.

In a fourth variation, an alkali borosilicate glass is melted, drawn into homogeneous rods, but treated to cause phase separation and leached to produce a silica-rich skeleton. The skeleton is then "molecularly stuffed" with dopants or combinations of dopants as described in U.S. Pat. No. 3,938,974 to give a high index, high expansion coefficient core and a low index, high silica, low expansion clad. The preform is dried and collapsed, yielding a surface layer in compression. The preform is drawn into a prestressed fiber by the method given above.

EXAMPLE A

1. Melting

A glass having the composition in mol percent 3.6 $Na_2O$, 3.4 $K_2O$, 32.8 $B_2O_3$, 60.2 $SiO_2$ was melted using the following procedure. The raw materials $Na_2CO_3$, $K_2CO_3$, $H_3BO_3$ and $SiO_2$ are mixed and charged into a platinum crucible at 1400° C. After charging the glass is stirred between 1250° C. and 1450° C. using a platinum/rhodium stirrer until homogenization and fining result.

2. Rod Forming

The well-stirred and fined glass is transferred to a furnace at 900° C. The glass is allowed to cool to 900° C. during one hour.

Rods are drawn from the top surface of the melt having diameter 0.7 to 0.8 cm. The rods are drawn through the center of a cooling cylinder.

3. Heat Treatment

The drawn rods were heat treated at 550° C. for 1½ hours to cause phase separation.

4. Etching before Leaching

The rod was etched for 10 sec in 5% HF followed by a 30 sec. wash in water.

5. Leaching

The rods were leached at 95° C. with 3N HCl containing 20% $NH_4Cl$ by weight. The leaching time for the rod was in excess of 30 hours. The time being chosen from previous trials to be sufficient for the rate of weight loss to be almost nil. During leaching, by providing a cold spot at 40° C., the boric acid concentration in the leaching agent was kept below 50 g/liter, thus speeding up leaching and avoiding possible redeposition of boron compounds in the pores of the matrix.

The leached material is washed with de-ionized water. The washing is conveniently carried out at room temperature using 10 volumes of water to 1 volume of glass. The water is changed 6 to 8 times during 3 days.

7. Stuffing

The stuffing solution was prepared by mixing $CsNO_3$, $B_2O_3$ and water in the following amounts: 124 gm $CsNO_3$, 16 gm $B_2O_3$ in 54 cc water for 100 cc of solution at 102° C. The porous rod remained for 3 hours in the stuffing solution. The index profile was produced by unstuffing the rod in a solution prepared by mixing 17 gm $B_2O_3$ in 82 cc of water for 100 cc of solution at 99° C. The rod was unstuffed for 10 minutes to produce a graded index profile. Precipitation of the dopants and establishment of the stress producing profile was accomplished by replacing the first unstuffing solution by pure acetone at 0° C. The rate of $B_2O_3$ removal is strongly dependent on $B_2O_3$ concentration in the solvent. The time for removing $B_2O_3$ is thus best determined by observing the clear unstuffed region formed as the $B_2O_3$ is removed. When the unstuffed layer reaches the desired thickness the acetone is exchanged for pure ethyl ether at 0° C. The rod is left in ethyl ether for 18 hours after which time the ethyl ether is removed and the rod is dried.

The rod was dried by exposure to vacuum at 0° C. for 2 days followed by rate heating at 15° C./hr. to 625° C. under vacuum. The rod was then sintered under a 1/5 atmosphere of oxygen at 825° C.

8. Fiber Drawing

The preform was drawn down into a 170 micron diameter fiber using gas oxygen torches with the flames well-centered on the preform.

9. Fiber Properties a. The unstuffed cladding thickness was 3% of the radius.

b. Optical Attenuation

The optical attenuation of the fiber was measured by standard transmission methods to be less than 30 dB/km at 0.85 and at 1.05 microns.

c. Numerical Aperture

The numerical aperture of the fiber was greater than 0.2.

EXAMPLE B.

1. Melting

A glass having the composition in mol percent 3.6 $Na_2O$, 3.4 $K_2O$, 32.8 $B_2O_3$, 60.2 $SiO_2$ was melted using the following procedure. The raw materials $Na_2CO_3$, $K_2CO_3$, $H_3BO_3$ and $SiO_2$ are mixed and charged into a platinum crucible at 1400° C. After charging the glass is stirred between 1250° C. and 1450° C. using a platinum/rhodium stirrer until homogenization and fining result.

2. Rod Forming

The well-stirred and fined glass is transferred to a furnace at 900° C. The glass is allowed to cool to 900° C. during one hour.

Rods are drawn from the top surface of the melt having diameter 0.7 to 0.8 cm. The rods are drawn through the center of a cooling cylinder.

3. Heat Treatment

The drawn rods were heat treated at 550° C. for 1½ hours to cause phase separation.

4. Etching before Leaching

The rod was etched for 10 sec in 5% HF followed by a 30 sec. wash in water.

5. Leaching

The rods were leached at 95° C. with 3N HCl containing 20% $NH_4Cl$ by weight. The leaching time for the rod was in excess of 30 hours. The time being chosen from previous trials to be sufficient for the rate of weight loss to be almost nil. During leaching, by providing a cold spot at 40° C., the boric acid concentration in the leaching agent was kept below 50 g/liter, thus speeding up leaching and avoiding possible redeposition of boron compounds in the pores of the matrix.

6. Washing

The leached material is washed with de-ionized water. The washing is conveniently carried out at room temperature using 10 volumes of water to 1 volume of glass. The water is changed 6 to 8 times during 3 days. The stuffing solution was prepared by mixing $CsNO_3$, $B_2O_3$ and water in the following amounts: 124 gm $CsNO_3$, 16 gm $B_2O_3$ in 54 cc water for 100 cc of solution at 102° C. The porous rod remained for 3 hours in the stuffing solution. The rod was unstuffed by replacing the stuffing solution with a mixture of 50% methanol and 50% 1.5 N $HNO_3$. The unstuffing rate is strongly dependent on the cesium and boron concentrations in the solvent. The best procedure to determine the unstuffing time is to observe the formation of the unstuffed regions. The unstuffing of $CsNO_3$ is more rapid and thus two well-defined boundaries will be observed. When the desired thickness of the unstuffed region is obtained, the first unstuffing solvent is exchanged for methyl isobutyl ketone at 0° C. and the rod remains in that solvent for 18 hours after which time the rod is dried.

8. Fiber Drawing

The preform was drawn down into a 170 micron diameter fiber using gas oxygen torches with the flames well-centered on the preform.

9. Fiber Properties a. Surface Compression

The surface compression of the fiber was determined to be 18,000 psi by measuring the optical retardation due to the stress.

b. Optical Attenuation

The optical attenuation of the fiber was measured by standard transmission methods to be less than 30 dB/km at 0.85 and at 1.05 microns.

c. Numerical Aperture

The numerical aperture of the fiber was greater than 0.2.

EXAMPLE C. (Partially Leached)

A glass having 62.3 $SiO_2$, 32.2 $B_2O_3$, 1.9 $Na_2O$, and 3.6 $K_2O$ in mol percent is melted according to the method of Example A.

1. Heat Treatment

The drawn rods are heat treated at 550° C. for 1½ hrs.

2. Etching before Leaching

Five minutes in HF followed by 30 sec. in water.

3. Leaching

The rod was leached for 2 hours at 95° C. with 3N HCL.

4. Washing

The rod was washed for 24 hours in methanol at 23° C.

5. Drying and Consolidating

The rod dried for 24 hours in a vacuum at 23° C. and ramped at 10° C./m to 100° C. and 20° C./min until collapse at 830° C.

6. Fiber Drawing

A 170 micron fiber was drawn using the method of Example A.

7. Fiber Properties a. Compression stress

The compressive stress at the surface of the fiber was measured to be 40,000 psi by the method of Example A.

b. Optical Attenuation

The optical attenuation of the fiber was measured to be less than 800 dB/km by the method of Example A.

c. The $T_g$ of the core was 260° C. less than that of the clad.

d. The numerical aperture of the fiber was greater than 0.15.

What is claimed is:

1. An article comprising a glass dielectric fiber waveguide with a composition profile varying radially from the center to the surface which creates a mechanical stress profile and an index of refraction profile, the composition profile forming a core, an intermediate optical clad layer having an index of refraction lower than the core, and a surface layer which is in compression having a thermal expansion coefficient smaller than the core, said surface layer having a predetermined thickness which is less than 10% of the radius of the core, said composition profile including (a) at least one dopant which creates said mechanical stress profile wherein the surface is in compression, the compression being greater than 20,000 psig, and (b) at least another dopant which creates said index of refraction profile.

2. An article according to claim 1 in which the optical attenuation is less than 30 dB/km and the numerical aperture is greater than 0.1.

3. An article according to claim 1 in which the index of refraction profile supports only a single mode, the loss is less than 30 dB/km, and the thickness of the surface layer is less than 2% of the radius.

4. An article according to claim 1, wherein the composition profile is substantially parabolic except in the surface layer where the dopant concentration is much steeper.

5. An article according to claim 4, wherein the thickness of the surface layer is less than 2% of the radius.

6. An article according to claim 1, wherein the composition profile varies stepwise to produce said intermediate optical clad layer and said surface layer.

* * * * *

UNITED STATES PATENT AND TRADEMARK OFFICE
CERTIFICATE OF CORRECTION

PATENT NO. : 4,181,403

DATED : January 1, 1980

INVENTOR(S) : Pedro B. MACEDO et al

It is certified that error appears in the above—identified patent and that said Letters Patent is hereby corrected as shown below:

In Section [73], after "Assignees", second line, change "Litovits" to read --Litovitz--

Signed and Sealed this

*Eleventh* Day of *November 1980*

[SEAL]

*Attest:*

SIDNEY A. DIAMOND

*Attesting Officer* *Commissioner of Patents and Trademarks*